(12) United States Patent
Malhotra et al.

(10) Patent No.: US 11,972,306 B2
(45) Date of Patent: *Apr. 30, 2024

(54) ROUTING OPTIMIZATIONS IN A NETWORK COMPUTING ENVIRONMENT

(71) Applicant: Arrcus Inc., San Jose, CA (US)

(72) Inventors: Neeraj Malhotra, Los Gatos, CA (US); Keyur Patel, San Jose, CA (US); Derek Man-Kit Yeung, Fremont, CA (US); Nalinaksh Pai, San Ramon, CA (US); Kalyani Rajaraman, San Jose, CA (US); Vikram Ragukumar, Pleasanton, CA (US)

(73) Assignee: Arrcus Inc., San Jose, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 17/530,163

(22) Filed: Nov. 18, 2021

(65) Prior Publication Data

US 2022/0075673 A1    Mar. 10, 2022

Related U.S. Application Data

(63) Continuation of application No. 16/549,439, filed on Aug. 23, 2019, now Pat. No. 11,212,215.
(Continued)

(51) Int. Cl.
*H04L 12/701* (2013.01)
*G06F 9/455* (2018.01)
(Continued)

(52) U.S. Cl.
CPC .......... *G06F 9/542* (2013.01); *G06F 9/45558* (2013.01); *G06F 9/4881* (2013.01);
(Continued)

(58) Field of Classification Search
None
See application file for complete search history.

(56) References Cited

U.S. PATENT DOCUMENTS 5,873,076 A    2/1999   Barr
6,879,594 B1   4/2005   Lee
(Continued)

FOREIGN PATENT DOCUMENTS

CA    2279845 A1    5/1998
CN    101848236 A   9/2010
(Continued)

OTHER PUBLICATIONS

Samman et al. "Multicash parallel pipeline router architecture for network-on-chip." In: Proceedings of the conference on Design, automation and test in Europe. Mar. 2008 (Mar. 2008) Retrieved on Oct. 18, 2019 (Oct. 18, 2019) from <https://www.researchgate.net/profile/Manfred_Glesner/publication/221340626_Multicast_Parallel_Pipeline_Router_Architecture_for_Network-on-Chip/links/02bfe50de0dc34c390000000/Multicast-Parallel-Pipeline-Router-Architecture-for-Network-on-Chip.pdf> entire document.
(Continued)

*Primary Examiner* — Scott M Sciacca
(74) *Attorney, Agent, or Firm* — David R. Stevens; Stevens Law Group

(57) ABSTRACT

Systems, methods, and devices for improved routing operations in a network computing environment. A system includes a network topology comprising a spine node and a plurality of leaf nodes. The system is such that at least one of the plurality of leaf nodes is associated with one or more networking prefixes. The spine node stores a prefix table. The prefix table includes a listing of networking prefixes in the network topology. The prefix table includes an indication of at least one equal-cost multipath routing (ECMP) group associated with each of the networking prefixes in the
(Continued)

network topology. The prefix table includes an indication of at least one leaf node of the plurality of leaf nodes associated with each of the networking prefixes in the network topology.

19 Claims, 7 Drawing Sheets

Related U.S. Application Data

(60) Provisional application No. 62/722,003, filed on Aug. 23, 2018.

(51) Int. Cl.
*G06F 9/48* (2006.01)
*G06F 9/54* (2006.01)
*G06F 16/22* (2019.01)
*G06F 16/23* (2019.01)
*G06F 16/27* (2019.01)
*H04L 9/40* (2022.01)
*H04L 12/28* (2006.01)
*H04L 12/44* (2006.01)
*H04L 12/46* (2006.01)
*H04L 12/66* (2006.01)
*H04L 12/721* (2013.01)
*H04L 12/741* (2013.01)
*H04L 12/753* (2013.01)
*H04L 45/00* (2022.01)
*H04L 45/02* (2022.01)
*H04L 45/24* (2022.01)
*H04L 45/28* (2022.01)
*H04L 45/48* (2022.01)
*H04L 45/50* (2022.01)
*H04L 45/586* (2022.01)
*H04L 45/745* (2022.01)
*H04L 47/125* (2022.01)
*H04L 67/1097* (2022.01)
*H04L 67/55* (2022.01)
*H04L 49/25* (2022.01)

(52) U.S. Cl.
CPC ............ *G06F 9/54* (2013.01); *G06F 16/2272* (2019.01); *G06F 16/2379* (2019.01); *G06F 16/27* (2019.01); *G06F 16/278* (2019.01); *H04L 12/2881* (2013.01); *H04L 12/44* (2013.01); *H04L 12/462* (2013.01); *H04L 12/4633* (2013.01); *H04L 12/4641* (2013.01); *H04L 12/66* (2013.01); *H04L 45/02* (2013.01); *H04L 45/22* (2013.01); *H04L 45/24* (2013.01); *H04L 45/26* (2013.01); *H04L 45/28* (2013.01); *H04L 45/48* (2013.01); *H04L 45/50* (2013.01); *H04L 45/586* (2013.01); *H04L 45/66* (2013.01); *H04L 45/745* (2013.01); *H04L 47/125* (2013.01); *H04L 63/0272* (2013.01); *H04L 67/1097* (2013.01); *H04L 67/55* (2022.05); *G06F 2009/45595* (2013.01); *H04L 2012/4629* (2013.01); *H04L 49/25* (2013.01)

(56) References Cited

U.S. PATENT DOCUMENTS

| | | |
|---|---|---|
| 6,970,561 B1 | 11/2005 | Obana |
| 7,274,869 B1 | 9/2007 | Pan |
| 7,593,320 B1 | 9/2009 | Cohen et al. |
| 7,945,813 B1 | 5/2011 | Watson |
| 7,970,918 B2 | 6/2011 | Thompson et al. |
| 8,060,533 B1 | 11/2011 | Wheeler |
| 8,756,656 B1 | 6/2014 | Hartmann |
| 8,849,955 B2 | 9/2014 | Prahlad |
| 9,288,101 B1 | 3/2016 | Dalal |
| 9,330,154 B2 | 5/2016 | Di |
| 9,331,940 B2 | 5/2016 | Balus |
| 9,544,185 B1 | 1/2017 | Yadav |
| 9,652,483 B1 | 5/2017 | Cao et al. |
| 10,200,274 B1 | 2/2019 | Suryanarayana |
| 10,530,873 B1 | 1/2020 | Arya |
| 10,931,530 B1* | 2/2021 | Rzehak ................. H04L 45/742 |
| 11,074,300 B1 | 7/2021 | Falco |
| 2003/0012133 A1 | 1/2003 | Jappinen |
| 2003/0012193 A1 | 1/2003 | Novaes |
| 2004/0003064 A1 | 1/2004 | Astley |
| 2004/0264460 A1 | 12/2004 | Yoshimoto |
| 2005/0021622 A1 | 1/2005 | Cullen |
| 2006/0136256 A1 | 6/2006 | Roots |
| 2006/0233322 A1 | 10/2006 | Allman |
| 2007/0074150 A1 | 3/2007 | Jolfaei et al. |
| 2007/0086429 A1 | 4/2007 | Lawrence |
| 2007/0104192 A1 | 5/2007 | Yoon |
| 2007/0291773 A1 | 12/2007 | Khan |
| 2009/0043911 A1 | 2/2009 | Flammer |
| 2009/0296579 A1* | 12/2009 | Dharwadkar ....... H04L 12/4641 370/235 |
| 2010/0046531 A1 | 2/2010 | Louati |
| 2010/0061366 A1 | 3/2010 | DelRegno |
| 2010/0125574 A1 | 5/2010 | Navas |
| 2010/0189115 A1 | 7/2010 | Kitada |
| 2010/0189117 A1 | 7/2010 | Gowda |
| 2010/0211781 A1 | 8/2010 | Auradkar et al. |
| 2010/0250867 A1 | 9/2010 | Bettger |
| 2010/0293235 A1 | 11/2010 | Cadore |
| 2011/0004913 A1 | 1/2011 | Nagarajan |
| 2012/0201124 A1 | 8/2012 | Marques |
| 2012/0281700 A1 | 11/2012 | Koganti |
| 2012/0300782 A1 | 11/2012 | Farinacci |
| 2013/0028073 A1 | 1/2013 | Tatipamula |
| 2013/0188521 A1 | 7/2013 | Jain |
| 2013/0286846 A1 | 10/2013 | Atlas et al. |
| 2013/0329584 A1 | 12/2013 | Ghose et al. |
| 2013/0336164 A1 | 12/2013 | Yang et al. |
| 2014/0044126 A1 | 2/2014 | Sabhanatarajan et al. |
| 2014/0092901 A1 | 4/2014 | Kapadia et al. |
| 2014/0112122 A1 | 4/2014 | Kapadia |
| 2014/0207991 A1 | 7/2014 | Kaushik |
| 2014/0233399 A1 | 8/2014 | Mann |
| 2014/0258485 A1 | 9/2014 | Yang |
| 2014/0317616 A1 | 10/2014 | Chu |
| 2014/0366037 A1 | 12/2014 | Berretta |
| 2014/0372748 A1 | 12/2014 | Dixon |
| 2015/0010002 A1 | 1/2015 | Duda |
| 2015/0124590 A1 | 5/2015 | Chu |
| 2015/0172172 A1 | 6/2015 | DeCusatis et al. |
| 2015/0188753 A1 | 7/2015 | Anumala et al. |
| 2015/0188808 A1 | 7/2015 | Ghanwani |
| 2015/0195136 A1 | 7/2015 | Mermoud |
| 2015/0199415 A1 | 7/2015 | Bourbonnais |
| 2015/0263899 A1 | 9/2015 | Tubaltsev |
| 2015/0304206 A1 | 10/2015 | Filsfils et al. |
| 2015/0312134 A1 | 10/2015 | Kapadia |
| 2015/0355946 A1 | 12/2015 | Kang |
| 2015/0381444 A1 | 12/2015 | Nainar |
| 2016/0014025 A1 | 1/2016 | Wang |
| 2016/0028613 A1 | 1/2016 | Haramaty |
| 2016/0065498 A1 | 3/2016 | Hayden |
| 2016/0112821 A1 | 4/2016 | Raleigh |
| 2016/0142313 A1 | 5/2016 | Devireddy et al. |
| 2016/0196320 A1 | 7/2016 | Borowiec |
| 2016/0277210 A1 | 9/2016 | Lin et al. |
| 2016/0294608 A1 | 10/2016 | Biswal |
| 2016/0337231 A1 | 11/2016 | Dixon |
| 2016/0352619 A1* | 12/2016 | Gattani .................. H04L 45/24 |
| 2016/0357778 A1 | 12/2016 | MacKenzie |
| 2017/0032011 A1* | 2/2017 | Song ...................... G06F 16/25 |
| 2017/0041239 A1 | 2/2017 | Goldenberg |
| 2017/0109369 A1 | 4/2017 | Feng |
| 2017/0126486 A1 | 5/2017 | Prieto |

(56) References Cited

U.S. PATENT DOCUMENTS

| | | |
|---|---|---|
| 2017/0155542 A1 | 6/2017 | Fang |
| 2017/0171057 A1 | 6/2017 | Dong et al. |
| 2017/0310548 A1 | 10/2017 | Jailani |
| 2017/0331669 A1 | 11/2017 | Ganesh |
| 2018/0034665 A1 | 2/2018 | Nguyen |
| 2018/0048591 A1 | 2/2018 | Sellappa et al. |
| 2018/0062914 A1 | 3/2018 | Boutros |
| 2018/0062993 A1 | 3/2018 | Wu |
| 2018/0121433 A1 | 5/2018 | Nevrekar |
| 2018/0167475 A1 | 6/2018 | Agarwal |
| 2018/0167476 A1 | 6/2018 | Hoffner |
| 2018/0183706 A1 | 6/2018 | Przygienda et al. |
| 2018/0205634 A1 | 7/2018 | Avci et al. |
| 2018/0219953 A1 | 8/2018 | Arra et al. |
| 2018/0220283 A1 | 8/2018 | Condeixa |
| 2018/0351857 A1 | 12/2018 | Vairavakkalai |
| 2019/0073419 A1 | 3/2019 | Dong |
| 2019/0089575 A1 | 3/2019 | Pundir |
| 2019/0104438 A1 | 4/2019 | Mittal |
| 2019/0124013 A1 | 4/2019 | Murugesan |
| 2019/0141112 A1 | 5/2019 | Kalathur |
| 2019/0149361 A1 | 5/2019 | Sarwar |
| 2019/0149896 A1* | 5/2019 | Grammel ............ H04J 14/0272 398/3 |
| 2019/0155741 A1 | 5/2019 | Linke |
| 2019/0207844 A1 | 7/2019 | Kodavanty |
| 2019/0260670 A1* | 8/2019 | Kulkarni ............... H04L 45/023 |
| 2019/0327166 A1 | 10/2019 | Thubert |
| 2019/0342389 A1 | 11/2019 | Bono |
| 2019/0349426 A1 | 11/2019 | Smith |
| 2019/0349733 A1 | 11/2019 | Nolan |
| 2019/0363975 A1 | 11/2019 | Djernaes |
| 2020/0036787 A1 | 1/2020 | Gupta |
| 2020/0044963 A1 | 2/2020 | Kwok |
| 2020/0084103 A1 | 3/2020 | Miller |
| 2021/0075630 A1 | 3/2021 | Immidi |

FOREIGN PATENT DOCUMENTS

| | | |
|---|---|---|
| CN | 101960426 A | 1/2011 |
| CN | 103984694 A | 8/2014 |
| CN | 104486124 | 4/2015 |
| CN | 105556502 A | 4/2016 |
| CN | 105991432 | 10/2016 |
| CN | 106878065 | 6/2017 |
| CN | 108075969 A | 6/2017 |
| CN | 107547402 | 1/2018 |
| EP | 3070877 | 9/2016 |
| JP | 2003204332 | 7/2003 |
| JP | 2016536690 | 11/2016 |
| JP | 2015515809 | 5/2018 |
| WO | 2015070236 | 5/2015 |

OTHER PUBLICATIONS

Wu et al. A new multi-channel MAC protocol with on-demand channel assignment for multi-hop mobile ad hoc networks. Dec. 9, 2000 (Dec. 9, 2000) Retrieved on Oct. 13, 2019 (Oct. 13, 2019) from <http://citeseerx.ist.psu.edu/viewdoc/download?doi=10.1.1.457.5412&rep=rep1&type=pdf> entire document.

"Samman et al. Multicast parallel pipeline router architecture for network-on-chip." "In: Proceedings of the conference on Design, automation and test in Europe. Mar. 2008 (Mar. 2008) Retrieved on Oct. 18, 2019 (Oct. 18, 2019) from. <https://www.researchgate.net/profile/Manfred_Glesner/publication/221340626_Multicast_Parall_el_Pipeline_Router_Architecture_for_Network-on-Chip/links/02bfe50de0dc34c390000000/Multicast-Parallel-Pipeline-Router-Architecture-for- Network-on-Chip.pdf> entire document".

"Saurav Haloi: Introduction to Apache ZooKeeper", Internet Citation, Feb. 5, 2015 (Feb. 5, 2015), XP002806551, Retrieved from the Internet: URL:https://hub.packtpub.com/introduction-apache-zookeeper/ [retrieved on May 18, 2022] * chapter ""The ZooKeeper Watches"".

"Husseman. A Beginner's Guide to Understanding the Leaf-Spine Network Topology." "In: West Monroe Partners. Mar. 23, 2015 (Mar. 23, 2015) Retrieved on Oct. 13, 2019 (Oct. 13, 2019) from <https://blog.westmonroepartners.com/a-beginners-guide-to-understanding-the-leaf-spine-network-topology/> entire document ".

VXLAN Tutorial, Ohira Shinichi, Cisco Systems G.K., Jan. 20, 2016, p. 1 to 49.

Sajassi et al., BGP MP LS-Based Ethernet VPN, Feb. 2015 (Year: 2015).

Juniper, Understanding EVPN Pure Route Type-5 on QFX Series Switches, Jul. 2017 (Year: 2017).

Juniper Networks, Understanding EVPN Pure Type 5 Routes, Sep. 16, 2022.

Internet Engineering Task Force (IETF) Request for Comments: 7432.

"WU et al. A new multi-channel MAC protocol with on-demand channel assignment for multi-hop mobile ad hoc networks.""In: Proceedings International Symposium on Parallel Architectures, Algorithms and Networks. Dec. 9, 2000 {Dec. 9, 2000) Retrieved on Oct. 13, 2019 (Oct. 13, 2019) from <http:/fciteseerx.ist.psu.edu/viewdoc/download? doi= 1O.1.1.457.5412&rep=rep1&type=pdf> entire document ".

* cited by examiner

ROUTING OPTIMIZATIONS IN A NETWORK COMPUTING ENVIRONMENT

CROSS-REFERENCE TO RELATED APPLICATIONS

This application is a continuation of U.S. patent application Ser. No. 16/549,439 filed Aug. 23, 2019 titled "Routing Optimizations In A Network Computing Environment," which claims priority to U.S. Provisional Patent Application Ser. No. 62/722,003 filed Aug. 23, 2018, titled "Database Systems Methods And Devices," both of which are hereby incorporated herein by reference in their entirety, including but not limited to those portions that specifically appear hereinafter, the incorporation by reference being made with the following exception: In the event that any portion of the above-referenced applications is inconsistent with this application, this application supersedes the above-referenced applications.

TECHNICAL FIELD

The disclosure relates to computing networks and particularly relates to network topology and routing protocols in a computer networking environment.

BACKGROUND

Network computing is a means for multiple computers or nodes to work together and communicate with one another over a network. There exist wide area networks (WAN) and local area networks (LAN). Both wide and local area networks allow for interconnectivity between computers. Local area networks are commonly used for smaller, more localized networks that may be used in a home, business, school, and so forth. Wide area networks cover larger areas such as cities and can even allow computers in different nations to connect. Local area networks are typically faster and more secure than wide area networks, but wide area networks enable widespread connectivity. Local area networks are typically owned, controlled, and managed in-house by the organization where they are deployed, while wide area networks typically require two or more constituent local area networks to be connection over the public Internet or by way of a private connection established by a telecommunications provider.

Local and wide area networks enable computers to be connected to one another and transfer data and other information. For both local and wide area networks, there must be a means to determine a path by which data is passed from one compute instance to another compute instance. This is referred to as routing. Routing is the process of selecting a path for traffic in a network or between or across multiple networks. The routing process usually directs forwarding on the basis of routing tables which maintain a record of the routes to various network destinations. Routing tables may be specified by an administrator, learned by observing network traffic, or built with the assistance of routing protocols.

Small networks may use manually configured routing tables to determine how information should travel from one computer to another computer. A routing table may include a listing of "best paths" indicating the most efficient or most desirable paths between a starting computer and a final destination computer. Larger networks, including networks connected to the public Internet, may rely on complex topologies that can change rapidly such that the manual construction of routing tables is unfeasible. Dynamic routing attempts to solve this problem by constructing routing tables automatically based on information carried by routing protocols. Dynamic routing enables a network to act nearly autonomously in avoiding network failures and blockages. There exist multiple routing protocols that provide rules or instructions for determining best paths between networked device. Examples of dynamic routing protocols and algorithms include Routing Information Protocol (RIP), Open Shortest Path First (OSPF), Enhanced Interior Gateway routing Protocol (EIGRP), and Border Gateway Protocol (BGP).

In some instances, path selection involves applying a routing metric to multiple routes to select or predict the best route. Most routing algorithms use only one network path at a time. Multiple path routing techniques enable the use of multiple alternative paths. In computer networks, a routing algorithm may be used to predict the best path between two compute instances. The routing algorithm may be based on multiple factors such as bandwidth, network delay, hop count, path cost, load, maximum transfer unit, reliability, and communication cost. The routing table stores a listing of the best paths. A topological database may store a list of the best paths and may further store additional information.

In some networks, routing is complicated by the fact that no single entity is responsible for selecting best paths. Instead, multiple entities are involved in selecting best paths or event portions of a single path. In the context of computer networking over the Internet, the Internet is partitioned into autonomous systems (AS) such as Internet Service Providers (ISPs). Each autonomous system controls routes involving its network. Autonomous system-level paths are selected based on the Border Gateway Protocol (BGP). Each autonomous system-level path includes a sequence of autonomous systems through which packets of information flow to travel from one compute instance to another compute instance. Each autonomous system may have multiple paths from which to choose that are offered by neighboring autonomous systems.

There are numerous network topologies that have varying benefits and deficiencies for different computing applications. One network topology is the leaf-spine network topology that includes spine nodes in communication with multiple leaf nodes. Traditional routing protocols for a leaf-spine network topology have numerous deficiencies and can lead to ineffective data loops when a leaf node has gone inactive. There exists a desire for an improved labeling protocol and routing protocol for leaf-spine network topologies.

In light of the foregoing, disclosed herein are systems, methods, and devices for improved routing operations in a network computing environment.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Figure 1:
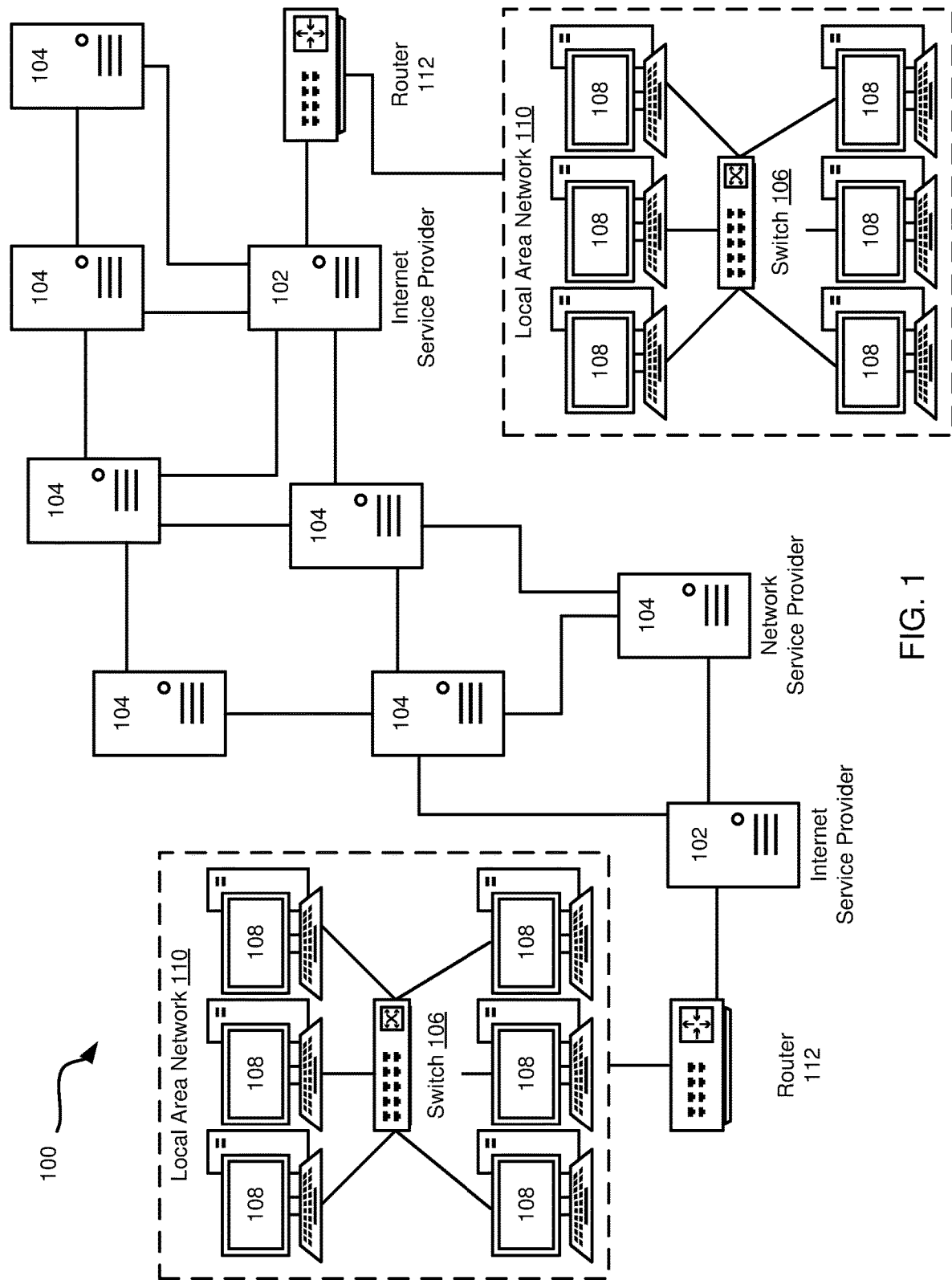
FIG. 1 is a schematic diagram of a system of networked devices communicating over the Internet.

Disclosed herein are systems, methods, and devices for improved network topology, routing labeling, and routing protocols in a network computing environment. An embodiment of the disclosure employs a per-prefix label that is attached to a network routing label before the prefix. The per-prefix label may be attached to a multi-homed prefix with equal-cost multipath (ECMP) paths. The pre-prefix label together with the ECMP paths leads to an explosion of ECMP groups with different label encapsulation per-prefix for each ECMP path.

In an embodiment, a routing label is allocated for each of a plurality of ECMP groups across multiple prefixes. A single ECMP group may provide multiple best paths for transmitting a data packet to a destination prefix. In a leaf-spine network topology, the destination prefix may be associated with multiple leaf nodes, and each of the multiple leaf nodes may be in communication with each spine node.

In an embodiment, a system includes a network topology comprising a spine node and a plurality of leaf nodes. The system is such that at least one of the plurality of leaf nodes is associated with one or more networking prefixes. The spine node stores a prefix table. The prefix table comprises a listing of networking prefixes within the network topology. The prefix table includes an indication of at least one ECMP group associated with each of the networking prefixes in the network topology. The prefix table includes an indication of at least one leaf node of the plurality of leaf nodes associated with each of the networking prefixes in the network topology.

An embodiment of the disclosure is deployed in a leaf-spine Clos network topology. The per-prefix label allocation leads to an increase in the number of ECMP groups available to upstream leaf routers. In an embodiment, a per-prefix label is allocated on and advertised from a spine router. This results in a unique label rewrite being installed per-prefix on the upstream leaf router toward the advertising spine next-hop router. The per-prefix label considers received labels from each next-hop router as part of the path key. In a Clos topology, the per-prefix label scheme optimizes the number of labels allocated on and advertised from a spine at layer "n" to a least number without explicit knowledge of the label allocation scheme used at the downstream router. Therefore, in a Clos topology, the per-prefix label decouples the label allocation scheme used by routers at each level while automatically providing optimal sharing of label rewrites and ECMP resource at each layer.

In a computer network environment, a networking device such as a switch or router may be used to transmit information from one destination to a final destination. In an embodiment, a data package and a message may be generated at a first location such as computer within a person's home. The data package and the message could be generated from the person interacting with a web browser and requesting information from or providing information to a remote server accessible over the Internet. In an example, the data package and the message could be information the person input into a form accessible on a webpage connected to the Internet. The data package and the message may need to be transmitted to the remote server that may be geographically located very far from the person's computer. It is very likely that there is no direct communication between the router at the person's home and the remote server. Therefore, the data package and the message must travel by "hopping" to different networking devices until reaching the final destination at the remote server. The router at the person's home must determine a route for transmitting the data package and the message thru multiple different devices connected to the Internet until the data package and the message reach the final destination at the remote server.

The processes of determining a best bath from a first location to a final destination and forwarding data packages and messages to a next destination are significant functions performed by a networking device such as a switch or router. The connections between networking devices in a network is referred to as the network topology. Network topology is the arrangement of elements such as links and nodes in a communication network. A network topology may include wired links, wireless links, or a combination of wired and wireless links between nodes in the network. Some examples of wired links include coaxial cables, telephone lines, power lines, ribbon cables, optical fibers, and so forth. Some examples of wireless links include satellites, cellular signals, radio signals, free-space optical communication, and so forth. The network topology includes an indication of all nodes in the network (e.g. computers, routers, switches, and other devices) and an indication of the linkages between nodes. Disclosed herein are systems, methods, and devices for improving network topology.

For purposes of furthering understanding of the disclosure, some explanation will be provided for numerous networking computing devices and protocols.

A BGP instance is a device for routing information in a network. A BGP instance may take the form of a route reflector appliance. The BGP instance may run on a switch, router, or BGP speakers on a switch. At a high level, the BGP instance sends all the paths it has learnt for a prefix to the best path controller. The best path controller responds with a set of best path from amongst those paths. The best path controller is permitted to modify the next-hop and attributes for any of the paths. Once the best paths are received, the BGP instance updates the local Routing Information Base (RIB) and advertises the best path out to its neighbors.

A switch (may alternatively be referred to as a switching hub, bridging hub, or MAC bridge) creates a network. Most internal networks use switches to connect computers, printers, phones, camera, lights, and servers in a building or campus. A switch serves as a controller that enables networked devices to talk to each other efficiently. Switches connect devices on a computer network by using packet switching to receive, process, and forward data to the destination device. A network switch is a multiport network bridge that uses hardware addresses to process and forward data at a data link layer (layer 2) of the Open Systems Interconnection (OSI) model. Some switches can also process data at the network layer (layer 3) by additionally incorporating routing functionality. Such switches are commonly known as layer-3 switches or multilayer switches.

A router connects networks. Switches and routers perform similar functions, but each has its own distinct function to perform on a network. A router is a networking device that forwards data packets between computer networks. Routers perform the traffic directing functions on the Internet. Data sent through the Internet, such as a web page, email, or other form of information, is sent in the form of a data packet. A packet is typically forwarded from one router to another router through the networks that constitute an internetwork (e.g., the Internet) until the packet reaches its destination node. Routers are connected to two or more data lines from different networks. When a data packet comes in on one of the lines, the router reads the network address information in the packet to determine the ultimate destination. Then, using information in the router's routing table or routing policy, the router directs the packet to the next network on its journey. A BGP speaker is a router enabled with the Border Gateway Protocol (BGP).

A customer edge router (CE router) is a router located on the customer premises that provides an interface between the customer's LAN and the provider's core network. CE routers, provider routers, and provider edge routers are components in a multiprotocol label switching architecture. Provider routers are located in the core of the provider's or carrier's network. Provider edge routers sit at the edge of the network. Customer edge routers connect to provider edge routers and provider edge routers connect to other provider edge routers over provider routers.

A routing table or routing information base (RIB) is a data table stored in a router or a networked computer that lists the routes to particular network destinations. In some cases, a routing table includes metrics for the routes such as distance, weight, and so forth. The routing table includes information about the topology of the network immediately around the router on which it is stored. The construction of routing tables is the primary goal of routing protocols. Static routes are entries made in a routing table by non-automatic means and which are fixed rather than being the result of some network topology discovery procedure. A routing table may include at least three information fields, including a field for network ID, metric, and next hop. The network ID is the destination subnet. The metric is the routing metric of the path through which the packet is to be sent. The route will go in the direction of the gateway with the lowest metric. The next hop is the address of the next station to which the packet is to be sent on the way to its final destination. The routing table may further include quality of service associate with the route, links to filtering criteria lists associated with the route, interface for an Ethernet card, and so forth.

For purposes of illustrating the concept of a routing table, the routing table may be analogized to using a map for delivering a package. A routing table is similar to the use of a map for delivering a package to its final destination. When a node needs to send data to another node on a network, the node must first know where to send the data. If the node cannot directly connect to the destination node, the node must send the data to other nodes along a proper route to the destination node. Most nodes do not try to figure out which routes might work. Instead, a node will send an IP packet to a gateway in the LAN, which then decides how to route the data to the correct destination. Each gateway will need to keep track of which way to deliver various packages of data, and for this it uses a routing table. A routing table is a database that keeps track of paths, like a map, and uses these paths to determine which way to forward traffic. Gateways can also share the contents of their routing table with other nodes requesting the information.

For hop-by-hop routing, each routing table lists, for all reachable destinations, the address of the next device along the path to that destination, i.e. the next hop. Assuming the routing tables are consistent, the algorithm of relaying packets to their destination's next hop thus suffices to deliver data anywhere in a network. Hop-by-hop is a characteristic of an IP Internetwork Layer and the Open Systems Interconnection (OSI) model.

The Open Systems Interconnection (OSI) model is a conceptual model that characterizes and standardizes the communication functions of a computing system without regard to its underlying internal structure and technology. The goal of the OSI model is the interoperability of diverse communication systems with standard communication protocols. The OSI model partitions a communication system into abstraction layers. A layer serves the layer above it and is served by the layer below. For example, a layer that provides error-free communications across a network provides the path needed by applications above it, while it calls the next lower layer to send and receive packets that constitute the contents of that path. Two instances at the same layer are visualized as connected by a horizontal connection in that layer. Communication protocols enable an entity in one host to interact with a corresponding entity at the same layer in another host. Service definitions, like the OSI model, abstractly describe the functionality provided to an (N)-layer by an (N−1)-layer, wherein N is one of the layers of protocols operating in the local host.

Route control is a type of network management that aims to improve Internet connectivity and reduce bandwidth cost and overall internetwork operations. Some route control services include a suite of hardware-based and software-based products and services that work together to improve overall Internet performance and finetune the use of available Internet bandwidth at minimal cost. Route control can be successful in scenarios where a network or autonomous system is sourcing Internet bandwidth from multiple providers. Route control can aid in the selection of the most optimal path for data transmission.

Some network communication systems are large, enterprise-level networks with thousands of processing nodes. The thousands of processing nodes share bandwidth from multiple Internet Service Providers (ISPs) and can process significant Internet traffic. Such systems can be extremely complex and must be properly configured to result in acceptable Internet performance. If the systems are not properly configured for optimal data transmission, the speed of Internet access can decrease, and the system can experience high bandwidth consumption and traffic. To counteract this problem, a set of services may be implemented to remove or reduce these concerns. This set of services may be referred to as routing control.

An embodiment of a routing control mechanism is composed of hardware and software. The routing control mechanism monitors all outgoing traffic through its connection with an Internet Service Provider (ISP). The routing control mechanism aids in selecting the best path for efficient transmission of data. The routing control mechanism may calculate the performance and efficiency of all ISPs and select only those ISPs that have performed optimally in applicable areas. Route control devices can be configured according to defined parameters pertaining to cost, performance, and bandwidth.

A known algorithm for determining the best path for the transmission of data is referred to as the Border Gateway Protocol (BGP). BGP is a path-vector protocol that provides routing information for autonomous systems on the Internet.

When BGP is configured incorrectly, it can cause sever availability and security issues. Further, modified BGP route information can permit attackers to redirect large blocks of traffic so the traffic travels to certain routers before reaching its intended destination. The BGP best path algorithm can be implemented to determine the best path to install in an Internet Protocol (IP) routing table for traffic forwarding. BGP routers may be configured to receive multiple paths to the same destination.

The BGP best path algorithm assigns a first valid path as the current best path. The BGP best path algorithm compares the best path with the next path in the list until the BGP reaches the end of the list of valid paths. The list provides the rules that are used to determine the best path. For example, the list may include an indication that the path with the highest weight is preferred, the path without a local preference is preferred, the path that was locally originated by way of a network or aggregate BGP is preferred, a shortest path is preferred, a path with the lowest multi-exit discriminator is preferred, and so forth. The BGP best path selection process can be customized.

In the context of BGP routing, each routing domain is known as an autonomous system (AS). BGP assists in selecting a path through the Internet to connect two routing domains. BGP typically selects a route that traverses the least number of autonomous systems, referred to as the shortest AS path. In an embodiment, once BGP is enabled, a router will pull a list of Internet routes from BGP neighbors which may be ISPs. BGP will then scrutinize the list to find routes with the shortest AS paths. These routes may be entered in the router's routing table. Generally, a router will choose the shortest path to an AS. BGP uses path attributes to determine how to route traffic to specific networks.

Equal cost multipath (ECMP) routing is a routing strategy where next-hop packet forwarding to a single destination can occur over multiple "best paths." The multiple best paths are equivalent based on routing metric calculations. Multiple path routing can be used in conjunction with many routing protocols because routing is a per-hop decision limited to a single router. Multiple path routing can substantially increase bandwidth by load-balancing traffic over multiple paths. However, there are numerous issues known with ECMP routing when the strategy is deployed in practice. Disclosed herein are systems, methods, and devices for improved ECMP routing.

A Clos network can be deployed in telecommunications. A Clos network is a multistage circuit-switching network that represents an idealization of multistage switching systems. A Clos network includes three stages, including the ingress stage, the middle stage, and the egress stage. Each stage is made up of a number of crossbar switches. Each cell enters an ingress crossbar switch that can be routed through any of the available middle stage crossbar switches to the relevant egress crossbar switch. A middle stage crossbar is available for a particular new call if both the link connecting the ingress switch to the middle stage switch, and the link connecting the middle stage switch to the egress switch, are free.

A leaf-spine network topology can be deployed for connecting nodes in a computer network. The leaf-spine topology has two layers, including the leaf layer and the spine layer. The leaf layer consists of access switches that connect to devices like servers, firewalls, load balancers, and edge routers. The spine layer is made up of switches that perform routing and forms the backbone of the network where every leaf switch is interconnected with each spine switch. In a leaf-spine topology, all devices are located the same number of links away from each other and include a predictable and consistent amount of delay or latency for transmitting information.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems and methods for tracking the life cycle of objects in a network computing environment are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Referring now to the figures, FIG. 1 illustrates a schematic diagram of a system 100 for connecting devices to the Internet. The system 100 includes multiple local area network 160 connected by a switch 106. Each of the multiple local area networks 160 can be connected to each other over the public Internet by way of a router 162. In the example system 100 illustrated in FIG. 1, there are two local area networks 160. However, it should be appreciated that there may be many local area networks 160 connected to one another over the public Internet. Each local area network 160 includes multiple computing devices 108 connected to each other by way of a switch 106. The multiple computing devices 108 may include, for example, desktop computers, laptops, printers, servers, and so forth. The local area network 160 can communicate with other networks over the public Internet by way of a router 162. The router 162 connects multiple networks to each other. The router 162 is connected to an internet service provider 102. The internet service provider 102 is connected to one or more network service providers 104. The network service providers 104 are in communication with other local network service providers 104 as shown in FIG. 1.

The switch 106 connects devices in the local area network 160 by using packet switching to receive, process, and forward data to a destination device. The switch 106 can be configured to, for example, receive data from a computer that is destined for a printer. The switch 106 can receive the data, process the data, and send the data to the printer. The switch 106 may be a layer-1 switch, a layer-2 switch, a layer-3 switch, a layer-4 switch, a layer-7 switch, and so forth. A layer-1 network device transfers data but does not manage any of the traffic coming through it. An example of a layer-1 network device is an Ethernet hub. A layer-2 network device is a multiport device that uses hardware addresses to process and forward data at the data link layer (layer 2). A layer-3 switch can perform some or all of the functions normally performed by a router. However, some network switches are limited to supporting a single type of physical network, typically Ethernet, whereas a router may support different kinds of physical networks on different ports.

The router 162 is a networking device that forwards data packets between computer networks. In the example system 100 shown in FIG. 1, the routers 162 are forwarding data packets between local area networks 160. However, the router 162 is not necessarily applied to forwarding data packets between local area networks 160 and may be used for forwarding data packets between wide area networks and so forth. The router 162 performs traffic direction functions on the Internet. The router 162 may have interfaces for different types of physical layer connections, such as copper cables, fiber optic, or wireless transmission. The router 162 can support different network layer transmission standards. Each network interface is used to enable data packets to be forwarded from one transmission system to another. Routers 162 may also be used to connect two or more logical groups of computer devices known as subnets, each with a different network prefix. The router 162 can provide connectivity within an enterprise, between enterprises and the Internet, or between internet service providers' networks as shown in FIG. 1. Some routers 162 are configured to interconnecting various internet service providers or may be used in large enterprise networks. Smaller routers 162 typically provide connectivity for home and office networks to the Internet. The router 162 shown in FIG. 1 may represent any suitable router for network transmissions such as an edge router, subscriber edge router, inter-provider border router, core router, internet backbone, port forwarding, voice/data/fax/video processing routers, and so forth.

The internet service provider (ISP) 102 is an organization that provides services for accessing, using, or participating in the Internet. The ISP 102 may be organized in various forms, such as commercial, community-owned, non-profit, or privately owned. Internet services typically provided by ISPs 102 include Internet access, Internet transit, domain name registration, web hosting, Usenet service, and colocation. The ISPs 102 shown in FIG. 1 may represent any suitable ISPs such as hosting ISPs, transit ISPs, virtual ISPs, free ISPs, wireless ISPs, and so forth.

The network service provider (NSP) 104 is an organization that provides bandwidth or network access by providing direct Internet backbone access to Internet service providers. Network service providers may provide access to network access points (NAPs). Network service providers 104 are sometimes referred to as backbone providers or Internet providers. Network service providers 104 may include telecommunication companies, data carriers, wireless communication providers, Internet service providers, and cable television operators offering high-speed Internet access. Network service providers 104 can also include information technology companies.

It should be appreciated that the system 100 illustrated in FIG. 1 is exemplary only and that many different configurations and systems may be created for transmitting data between networks and computing devices. Because there is a great deal of customizability in network formation, there is a desire to create greater customizability in determining the best path for transmitting data between computers or between networks. In light of the foregoing, disclosed herein are systems, methods, and devices for offloading best path computations to an external device to enable greater customizability in determining a best path algorithm that is well suited to a certain grouping of computers or a certain enterprise.

Figure 2:
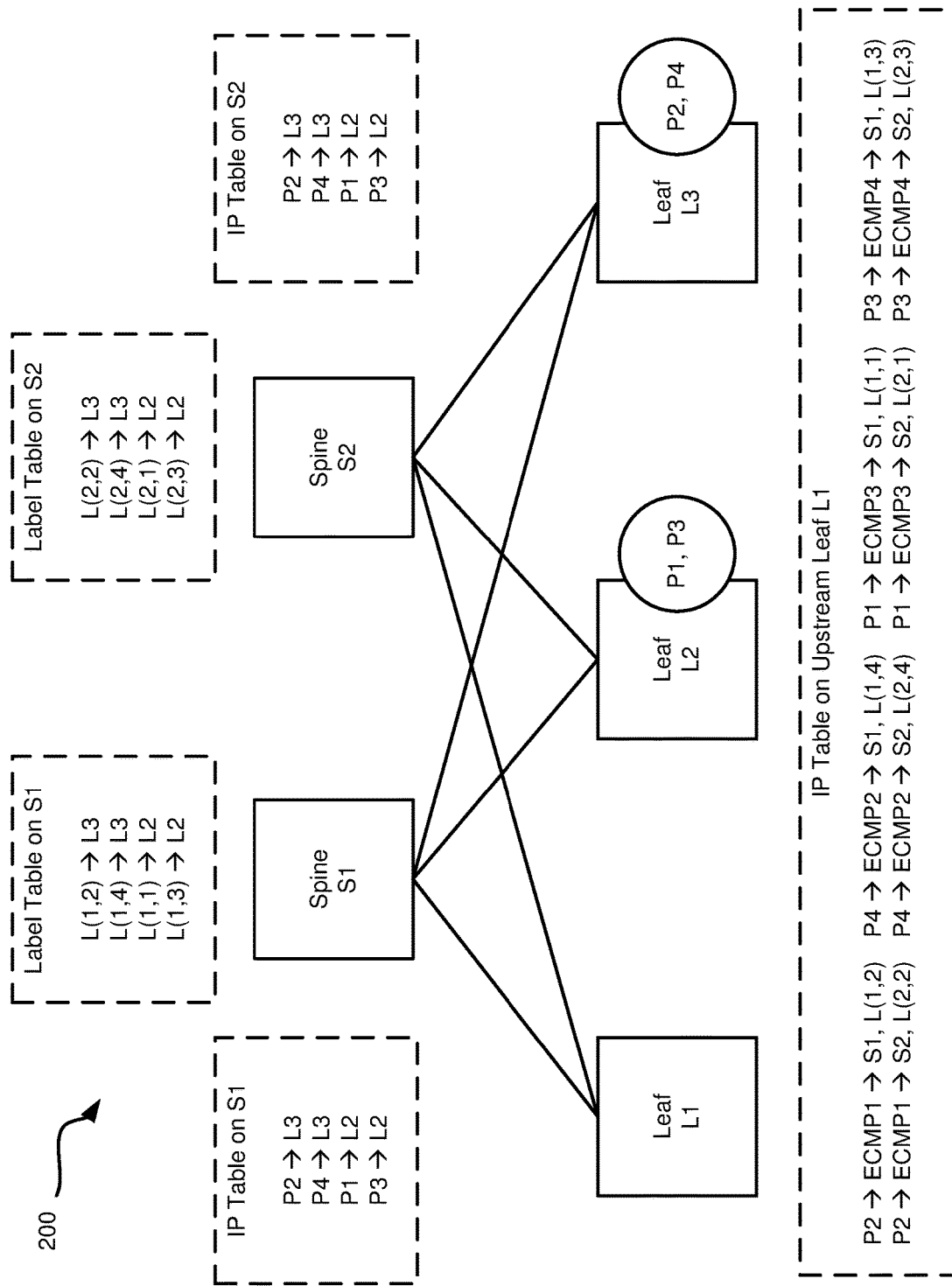
FIG. 2 is a schematic diagram of a leaf-spine network topology and a routing protocol with per-prefix label allocation on the spine.

FIG. 2 is a schematic diagram of an example topology 200 having a leaf-spine architecture. The topology 200 includes two spine nodes S1 and S2. The topology 200 further includes three leaf nodes L1, L2, and L3. In a leaf-spine topology, all devices S1, S2, L1, L2, L3 are the same number of segments away. This is possible because the topology 200 only has two layers, include the spine layer and the leaf layer. The leaf layer LL L2, L3 consists of access switches that connect to devices like servers, firewalls, load balancers, and edge routers. The spine layer S1, S2 is made up of switches that perform routing and serves as the backbone of the network where every leaf L1, L2, L3 switch is interconnected with each spine S1, S2 switch.

To allow for the predictable distance between devices in the two-layered topology 200, dynamic Layer3 routing can be used to interconnect the layers. Dynamic routing allows the best path to be determined and adjusted based on responses to network change. This type of topology 200 can be used for data center architectures with a focus on East-West network traffic.

A network deploying the topology 200 may use Layer3 routing. All routes are configured in an active state through the use of equal cost multipathing (ECMP). This allows all connection to be used at the same time while remaining stable and avoiding loops within the network. With traditional Layer2 switching protocols such as Spanning Tree on three-tiered networks, the topology must be configured on all devices correctly and all of the assumptions that the Spanning Tree Protocol (STP) relies upon must be considered. The removal of STP between the access and aggregation layers in lieu of Layer3 routing results in a more stable environment.

A further advantage of the topology 200 is the ease of adding additional hardware and capacity. When oversubscription of links occurs (meaning that more traffic is generated than can be aggregated on to the active link at one time), the ability to expand capacity is straightforward. An additional spine switch may be added, and uplinks may be extended to each leaf switch. This results in the addition of interlayer bandwidth and reduction of the oversubscription. When device port capacity becomes an issue, a new leaf switch can be added by connecting the new leaf switch to every spine and adding the network configuration to the new leaf switch.

Referring again to FIG. 2, the topology 200 can use the BGP as a control plan for labeled IP reachability. Per-prefix label allocation as discussed herein leads to an explosion of ECMP groups on upstream leaf routers L1, L2, L3. As shown in FIG. 2, each spine S1, S2, includes a prefix table and a label table. The label table includes pre-prefix labels allocated on and advertised from the spine router to upstream leaf routers. The per-prefix label results in a unique label rewrite being installed per-prefix on the upstream leaf router toward the advertising spine next-hop router.

In the example implementation shown in FIG. 2, leaf L2 is associated with prefixes P1 and P3. Leaf L3 is associated with prefixes P2 and P4. Four different ECMP path lists are programmed because of different label rewrites for prefixes P1, P2, P3, and P4. In general, the number of ECMP path lists is equal to the number of prefixes. The L(x,y) notations in FIGS. 2-5 indicate the per-prefix label allocated by spine-x for prefix-y. Therefore, the first number in the L(x,y) notation is the spine number and the second number in the L(x,y) notation is the prefix number.

The prefix tables on spines S1 and S2 indicate that prefix P2 is on leaf L3, prefix P4 is on leaf L3, prefix P1 is on leaf L2, and prefix P3 is on leaf L2. The prefix table is the same for the two spines S1 and S2 shown in the topology 200.

The label table for S1 indicates that when spine S1 receives packet with label L(1,2) associated with prefix P2, the packet is transmitted to leaf L2. Similarly, when spine S1 receives data with prefix P4, the data is transmitted to leaf L3. Further, when spine S1 receives data with prefix P1, the data is transmitted to leaf L2. Lastly, when spine S1 receives data with prefix P3, the data is transmitted to leaf L2.

The label table for S2 indicates that when spine S2 receives packet with label L(2,2) associated with prefix P2, the packet is transmitted to leaf L3. Further, when spine S2 receives data with prefix P1, the data is transmitted to leaf L2. Lastly, when spine S2 receives data with prefix P3, the data is transmitted to leaf L2.

As shown in FIG. 2, per-prefix label L(1,1) allocated by spine S1 for prefix P1 results in an ECMP path list on leaf L1 that is unique to prefix P1. The path list for leaf L1 is shown in the prefix table on upstream leaf L1.

Across a set of spine next hops in a Clos network, this results in ECMP groups on upstream leafs that are unique per-prefix. As a result, limited ECMP resources available on the forwarding ASIC cannot be shared across prefixes and hence become a prefix scale bottleneck.

Figure 3:
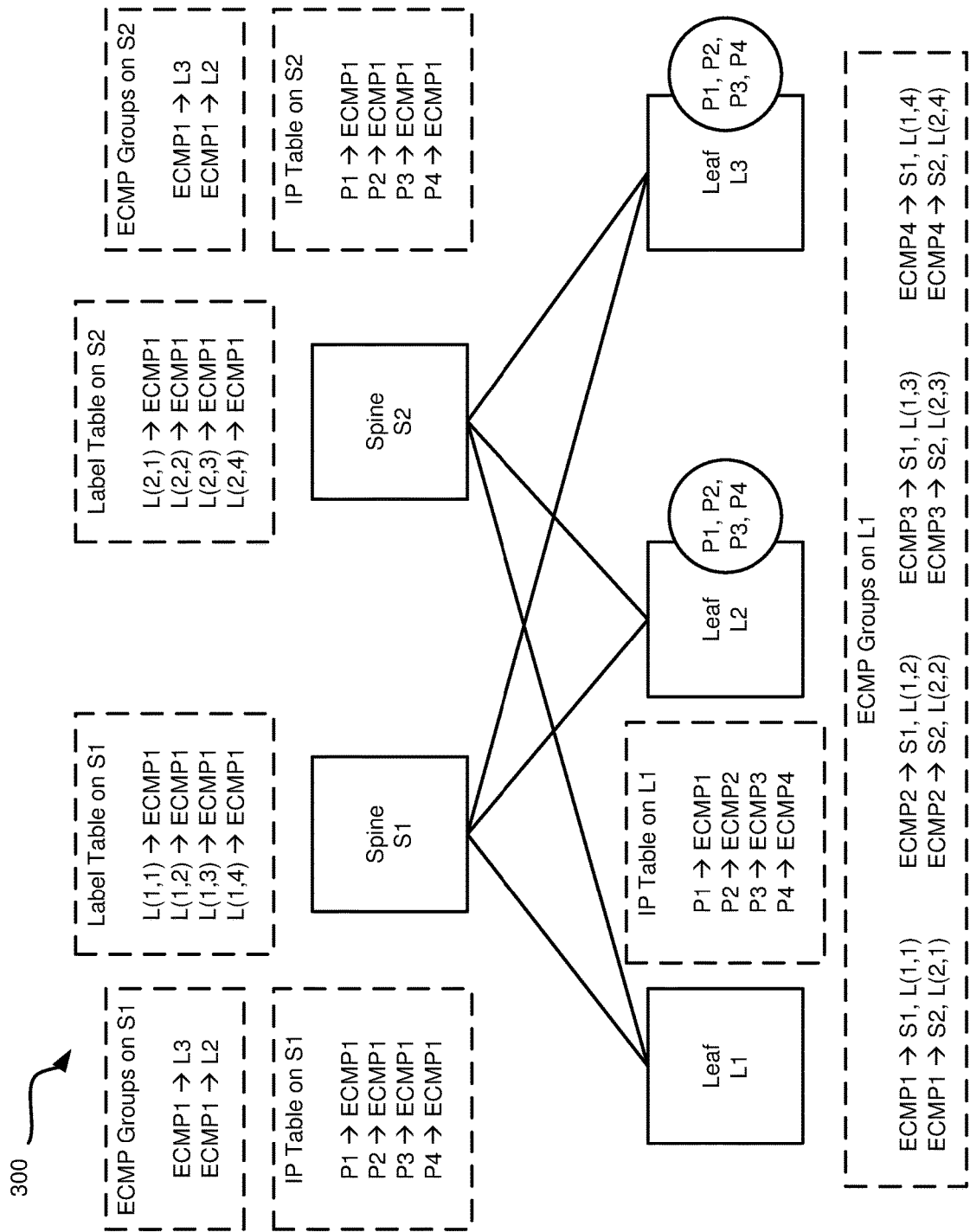
FIG. 3 is a schematic diagram of a leaf-spine network topology and a routing protocol with multi-homed prefixes and per-prefix label allocation on the spine.

FIG. 3 is a schematic diagram of an example topology 300 having a leaf-spine architecture. The topology 300 includes two spine nodes S1 and S2. The topology 300 further includes three leaf nodes L1, L2, and L3. In a leaf-spine topology, all devices S1, S2, L1, L2, L3 are the same number of segments away. This is possible because the topology 300 only has two layers, include the spine layer and the leaf layer. The leaf layer L1, L2, L3 consists of access switches that connect to devices like servers, firewalls, load balancers, and edge routers. The spine layer S1, S2 is made up of switches that perform routing and serves as the backbone of the network where every leaf L1, L2, L3 switch is interconnected with each spine S1, S2 switch.

The topology 300 shown in FIG. 3 illustrates an embodiment of a label which is a per-prefix label with multi-homed prefixes allocated on spines. This leads to treating leaf nodes as CE devices. A spine node allocating a local label per downstream next hop leaf router (per-CE) or per group of next hop leaf routers (resilient per-CE) may result in a spine advertising the same label for all prefixes learnt from a downstream leaf or a group of downstream leafs. This enables upstream leaf routers to use a common label rewrite for all prefixes originated from a set of leaf(s) toward a given spine next hop. This further enables the upstream leaf routers to share ECMP resources across those prefixes.

However, in some instances, a per-CE or resilient per-CE scheme can be limiting. The scheme can be limiting because it assumes leaf nodes always advertise IMP-NULL or a DEAG label for locally attached prefixes. This enables a spine to program a resilient per-CE local label to be used for forwarding to all prefixes behind a leaf with a shared IMP-NULL or DEAG label rewrite. Further, the scheme assumes a single level leaf-spine Clos topology. A multiple layer Clos topology would result in spines at layer (n) receiving multiple labels from each spine at layer (n−1) by virtue of spines at layer (n−1) being attached to multiple CEs at layer (n−2), therefore breaking per-CE forwarding semantics. The per-CE forwarding semantics are broken because the received label is not part of the key for the locally allocated CE label. For example, a spine might learn prefix P1 from downstream spine S1 with label L1 and prefix P2 from the same spine S1 with label L2 because prefixes P1 and P2 were learnt on S1 by way of different downstream leafs. An upstream spine at the next layer now cannot advertise prefixes P1 and P2 with the same per-CE label allocated for spine S1. This issue is resolved in the topology 400 shown in FIG. 4 and the topology 500 shown in FIG. 5.

Figure 4:
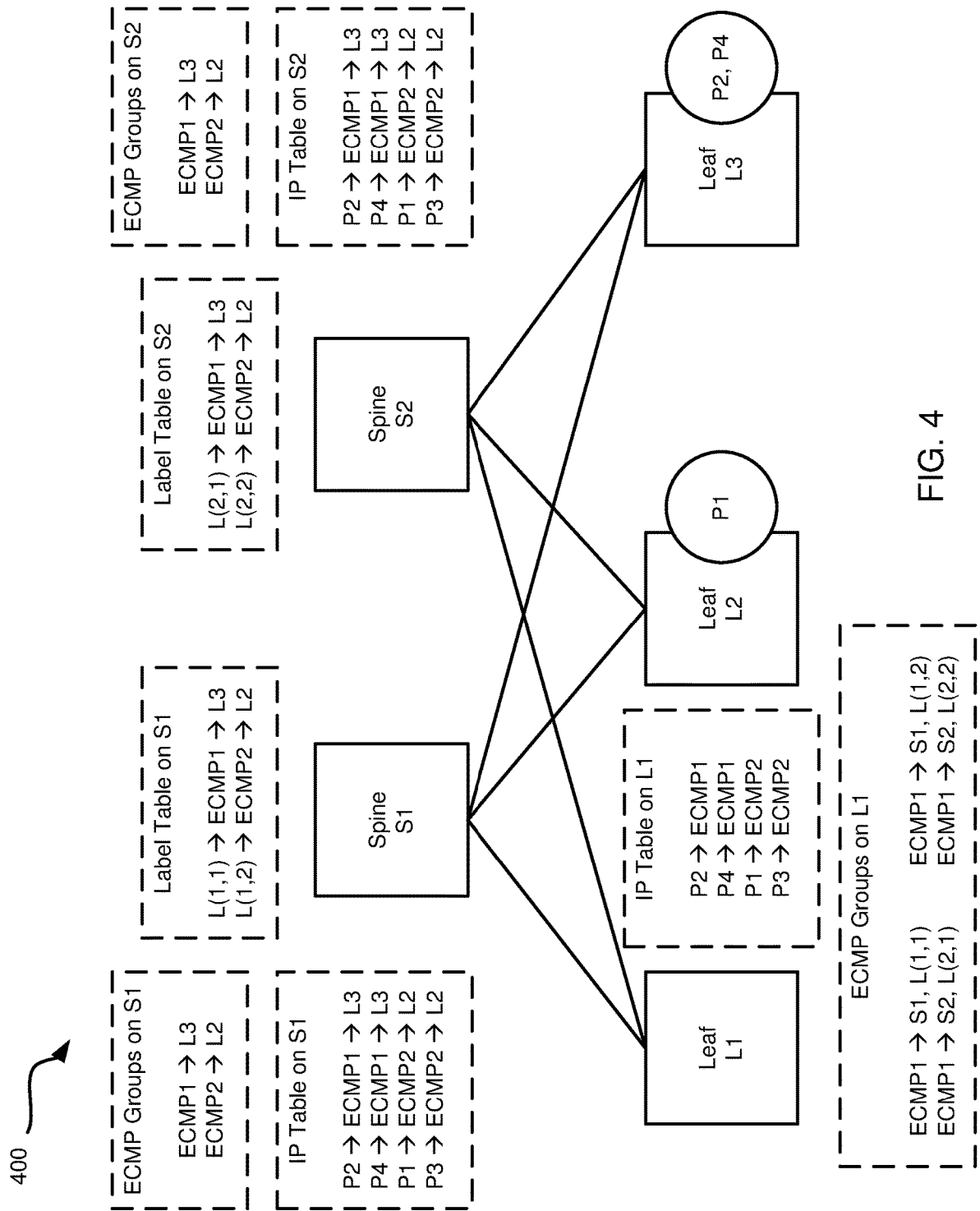
FIG. 4 is a schematic diagram of a leaf-spine network topology and a routing protocol with per-path list label allocation on the spine.

FIG. 4 is a schematic diagram of an example topology 400 having a leaf-spine architecture. The topology 400 includes two spine nodes S1 and S2. The topology 400 further includes three leaf nodes L1, L2, and L3. In a leaf-spine topology, all devices S1, S2, L1, L2, L3 are the same number of segments away. This is possible because the topology 400 only has two layers, include the spine layer and the leaf layer. The leaf layer L1, L2, L3 consists of access switches that connect to devices like servers, firewalls, load balancers, and edge routers. The spine layer S1, S2 is made up of switches that perform routing and serves as the backbone of the network where every leaf L1, L2, L3 switch is interconnected with each spine S1, S2 switch.

In the labeling scheme shown in FIG. 4, each of the spines S1, S2 includes ECMP groups, a label table, and a prefix table. This may be referred to herein as per-path list label allocation. The ECMP groups on spine S1 include ECMP1 pointing to leaf L3 and ECMP2 pointing to leaf L2. The label table on spine S1 includes a label allocated by spine S1 for ECMP group ECMP1 (notated L(1,1)). The label table on spine S1 further includes a label allocated by spine S1 for ECMP group ECMP2 (notated as L(1,2)). The prefix table on spine S1 indicates that prefix P2 points to ECMP1 and further points to leaf L3. The prefix table on spine S1 indicates that prefix P4 points to ECMP1 and further points to leaf L3. The prefix table on spine S1 indicates that prefix P1 points to ECMP2 and further points to leaf L2. The prefix table on spine S1 indicates that prefix P3 points to ECMP2 and further points to leaf L2.

The ECMP groups on spine S2 include ECMP1 pointing to leaf L3 and ECMP2 pointing to leaf L2. The label table on spine S2 includes a label for spine S2 in ECMP group ECMP1 (notated as L(2,1)) pointing to ECMP1 and further pointing to leaf L3. The label table on spine S2 further includes a label for spine S2 in ECMP group ECMP2 (notated as L(2,2)) pointing to ECMP2 and further pointing to leaf L2. The prefix table on spine S2 indicates that prefix P2 points to ECMP1 and further points to leaf L3. The prefix table on spine S2 indicates that prefix P4 points to ECMP1 and further points to leaf L3. The prefix table on spine S2 indicates that prefix P1 points to ECMP2 and further points to leaf L2. The prefix table on spine S2 indicates that prefix P3 points to ECMP2 and further points to leaf L2.

The prefix table on leaf L1 indicates the prefix P2 points to ECMP1, prefix P4 points to ECMP1, prefix P1 points to ECMP2, and prefix P3 points to ECMP2. The ECMP groups on leaf L1 includes ECMP1 pointing to spine S1, L(1,1), and L(1,2) and further pointing to spine S2, L(2,1) and L(2,2).

As shown in FIG. 4, leaf L2 is associated with prefix P1 and leaf L3 is associated with prefixes P2 and P4.

Figure 5:
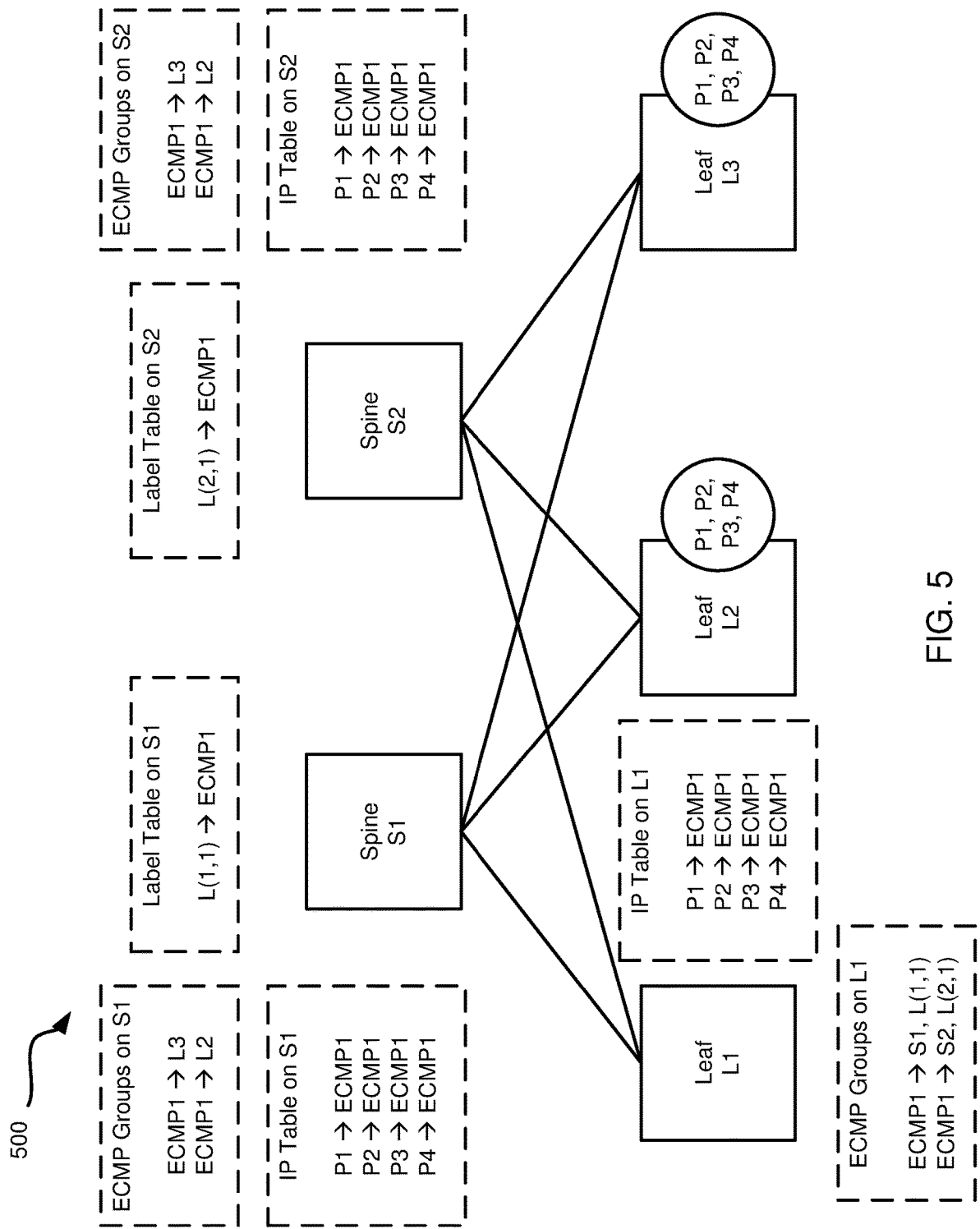
FIG. 5 is a schematic diagram of a leaf-spine network topology and a routing protocol with multi-homed prefixes and per-path list label allocation on the spine.

FIG. 5 is a schematic diagram of an example topology 500 having a leaf-spine architecture. The topology 500 includes two spine nodes S1 and S2. The topology 500 further includes three leaf nodes L1, L2, and L3. In a leaf-spine topology, all devices S1, S2, L1, L2, L3 are the same number of segments away. This is possible because the topology 500 only has two layers, include the spine layer and the leaf layer. The leaf layer L1, L2, L3 consists of access switches that connect to devices like servers, firewalls, load balancers, and edge routers. The spine layer S1, S2 is made up of switches that perform routing and serves as the backbone of the network where every leaf L1, L2, L3 switch is interconnected with each spine S1, S2 switch.

The ECMP groups on spines S1 and S2 include ECMP1 pointing to L3 and L2. The label table on spine S1 includes the notation L(1,1) which indicates that spine S1 points to ECMP1. The label table on spine S2 includes the notation L(2,1) which indicates that spine S2 points to ECMP1. The prefix tables on spines S1 and S2 indicate that prefixes P1, P2, P3, and P4 all point to ECMP1. The prefix table on leaf L1 indicates that prefixes P1, P2, P3, and P4 all point to ECMP1. The ECMP groups on leaf L1 indicate that ECMP1 points to spines S1 and S2. As shown in FIG. 5, the leafs L2 and L3 includes the prefixes P1, P2, P3, and P4.

The label structure illustrated in FIGS. 4 and 5 resolve the aforementioned issues discussed with respect to FIG. 3. In the topology 400, a new BGP local label allocation scheme allocates a local label per set of next hop-CE and received label paths. This per-path list label allocation shown in the topology 400, 500 considers received labels from each next hop router as part of the path key and the path list context used to allocate a per-path list local label. In a Clos topology, this label allocation scheme automatically optimizes the number of labels allocated on and advertised from a spine at layer n to a least number. This is a function of the number of labels advertised from downstream and next hop routers at layer n−1. This is done without explicit knowledge of the label allocation scheme used at the downstream router. In an embodiment, in a Clos topology, this scheme decouples label allocation used by routers at each layer while automatically providing optimal sharing of label rewrites and ECMP resources at each layer.

As an example, in a two-layer leaf-spine Clos topology, where leaf nodes advertise an IMP-NULL or DEAG label, the schemes illustrated in FIGS. 4 and 5 provide path list sharing optimization equivalent to a resilient per-CE label allocation scheme. In the case of per-CE labels advertised from leaf nodes, this results in as many labels allocated per downstream leaf on the spine. This provides an improved scale as compared to per-prefix label allocation.

Figure 6:
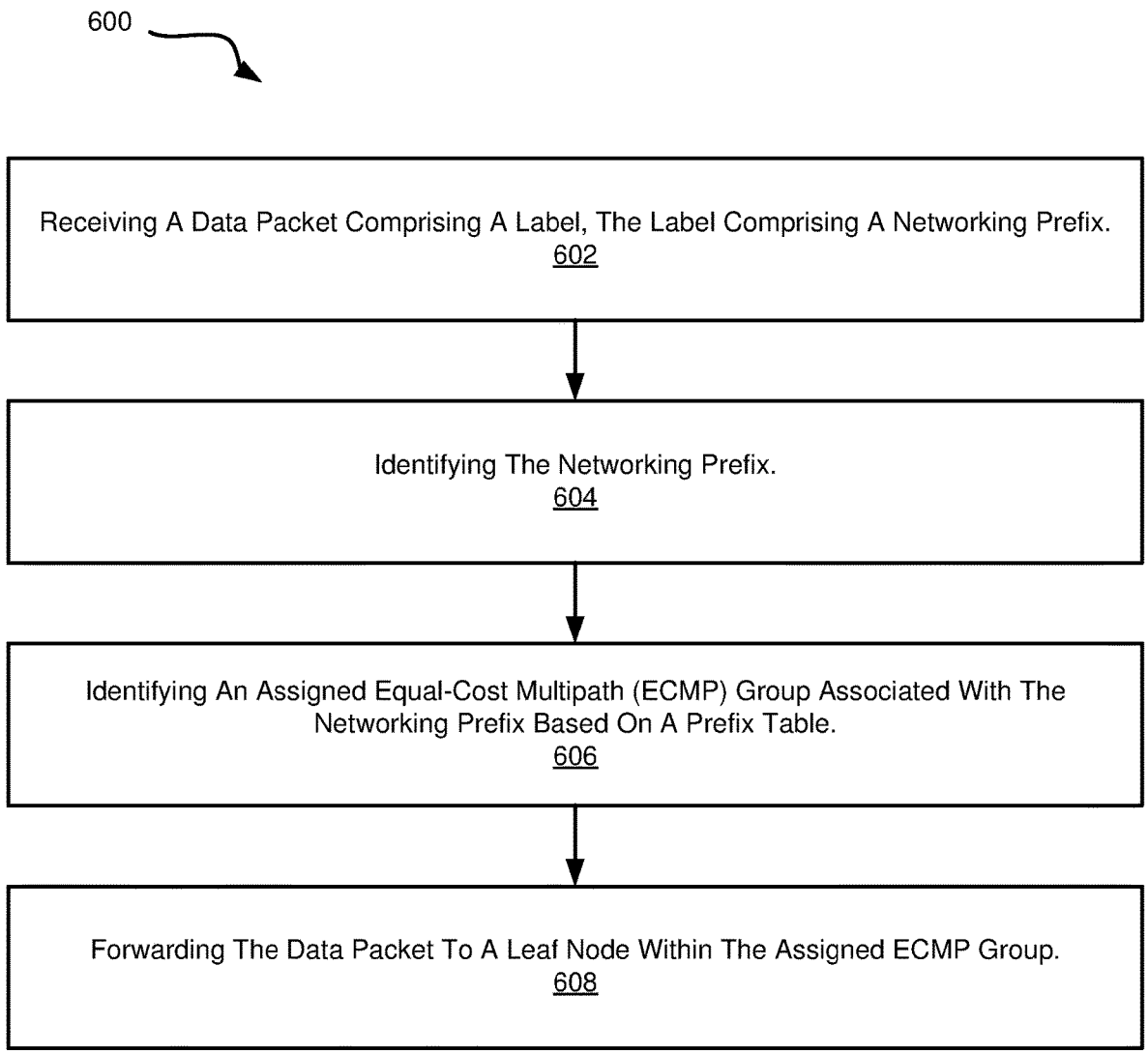
FIG. 6 is a schematic flow chart diagram of a method for routing a data packet in a networking environment.

FIG. 6 is a schematic block diagram of a method 600 for asynchronously receiving and reordering data to be transmitted with a networking device. The method 600 can be performed by a networking device such as a router or switch. In an embodiment, the method 600 is performed by a spine node S1, S2 and/or or a leaf node L1, L2, L3 as discussed herein. The method 600 may be performed by a node within a network topology or any other suitable computing device.

The method 600 begins and a computing device receives at 602 a data packet comprising a label. The label comprises a networking prefix. The method 600 continues and a computing device identifies at 604 the networking prefix in the label. The method 600 continues and a computing device identifies at 606 an assigned equal-cost multipath (ECMP) group associated with the networking prefix based on a prefix table. The method 600 continues and a computing device load balances at 608 the assigned ECMP group to identify an active leaf node within the assigned ECMP group. The method 600 continues and a computing device forwards at 710 the data packet to the active leaf node within the assigned ECMP group.

Figure 7:
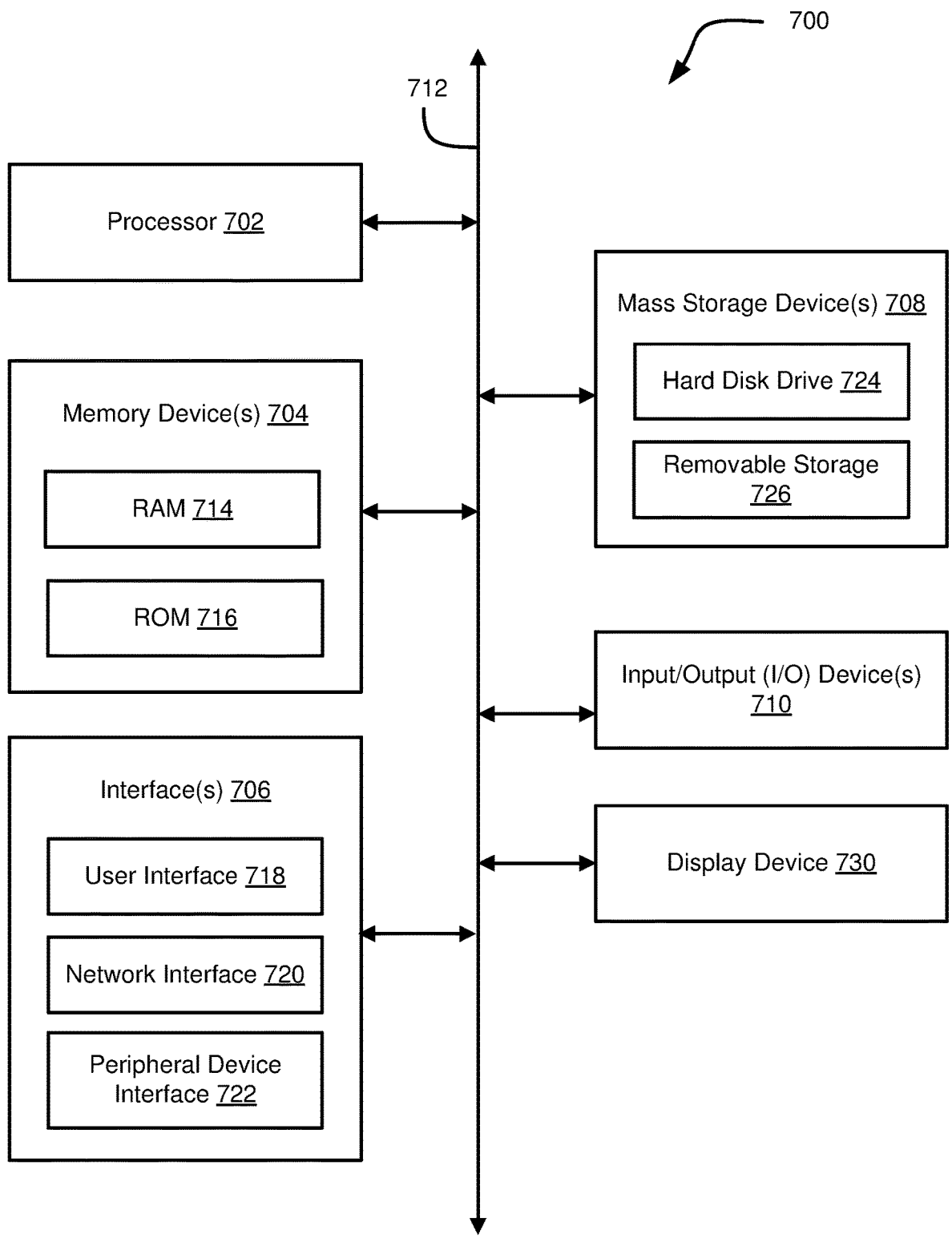
FIG. 7 is a schematic diagram illustrating components of an example computing device.

Referring now to FIG. 7, a block diagram of an example computing device 700 is illustrated. Computing device 700 may be used to perform various procedures, such as those discussed herein. In one embodiment, the computing device 700 can function to perform the functions of the asynchronous object manager and can execute one or more application programs. Computing device 700 can be any of a wide variety of computing devices, such as a desktop computer, in-dash computer, vehicle control system, a notebook computer, a server computer, a handheld computer, tablet computer and the like.

Computing device 700 includes one or more processor(s) 702, one or more memory device(s) 704, one or more interface(s) 706, one or more mass storage device(s) 708, one or more Input/output (I/O) device(s) 702, and a display device 730 all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM) 714) and/or nonvolatile memory (e.g., read-only memory (ROM) 716). Memory device(s) 704 may also include rewritable ROM, such as Flash memory.

Mass storage device(s) 708 include various computer readable media, such as magnetic tapes, magnetic disks, optical disks, solid-state memory (e.g., Flash memory), and so forth. As shown in FIG. 7, a particular mass storage device is a hard disk drive 724. Various drives may also be included in mass storage device(s) 708 to enable reading from and/or writing to the various computer readable media. Mass storage device(s) 708 include removable media 726 and/or non-removable media.

Input/output (I/O) device(s) 702 include various devices that allow data and/or other information to be input to or retrieved from computing device 700. Example I/O device(s) 702 include cursor control devices, keyboards, keypads, microphones, monitors or other display devices, speakers, printers, network interface cards, modems, and the like.

Display device 730 includes any type of device capable of displaying information to one or more users of computing device 700. Examples of display device 730 include a monitor, display terminal, video projection device, and the like.

Interface(s) 706 include various interfaces that allow computing device 700 to interact with other systems, devices, or computing environments. Example interface(s) 706 may include any number of different network interfaces 720, such as interfaces to local area networks (LANs), wide area networks (WANs), wireless networks, and the Internet. Other interface(s) include user interface 718 and peripheral device interface 722. The interface(s) 706 may also include one or more user interface elements 718. The interface(s) 706 may also include one or more peripheral interfaces such as interfaces for printers, pointing devices (mice, track pad, or any suitable user interface now known to those of ordinary skill in the field, or later discovered), keyboards, and the like.

Bus 712 allows processor(s) 702, memory device(s) 704, interface(s) 706, mass storage device(s) 708, and I/O device(s) 702 to communicate with one another, as well as other devices or components coupled to bus 712. Bus 712 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 700 and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, if any, any future claims submitted here and in different applications, and their equivalents.

EXAMPLES

The following examples pertain to further embodiments.

Example 1 is a system. The system includes a network topology comprising a spine node and a plurality of leaf nodes. The system is such that at least one of the plurality of leaf nodes is associated with one or more networking prefixes. The spine node stores a prefix table. The prefix table includes a listing of networking prefixes in the network topology. The prefix table includes an indication of at least one equal-cost multipath routing (ECMP) group associated with each of the networking prefixes in the network topology. The prefix table includes an indication of at least one leaf node of the plurality of leaf nodes associated with each of the networking prefixes in the network topology.

Example 2 is a system as in Example 1, wherein the spine node further comprises a label table indicating at least one ECMP group associated with the spine node and further indicating which of the plurality of leaf nodes is associated with the at least one ECMP group.

Example 3 is a system as in any of Examples 1-2, wherein each of the plurality of leaf nodes comprises a prefix table comprising: the listing of the networking prefixes in the network topology; and an indication of an ECMP group associated with each of the networking prefixes in the network topology.

Example 4 is a system as in any of Examples 1-3, wherein each of the plurality of leaf nodes is associated with at least one ECMP group.

Example 5 is a system as in any of Examples 1-4, wherein one or more ECMP groups are located on the spine node.

Example 6 is a system as in any of Examples 1-5, wherein a single ECMP group is on the spine node and the single ECMP group points to two or more leaf nodes of the plurality of leaf nodes.

Example 7 is a system as in any of Examples 1-6, wherein the networking prefixes are Internet Protocol (IP) address prefixes.

Example 8 is a system as in any of Examples 1-7, wherein the spine node is a router and at least one of the plurality of leaf nodes is a consumer electronics device.

Example 9 is a system as in any of Examples 1-8, wherein the network topology comprises a plurality of spine nodes and each of the plurality of spine nodes is in communication with each of the plurality of leaf nodes.

Example 10 is a system as in any of Examples 1-9, wherein the spine node is configured to implement a routing policy comprising per-packet load balancing within an applicable ECMP group.

Example 11 is one or more processors configurable to execute instructions stored in non-transitory computer readable storage media, the instructions comprising: receiving a data packet comprising a label, the label comprising a networking prefix; identifying the networking prefix; identifying an assigned equal-cost multipath (ECMP) group associated with the networking prefix based on a prefix table; and forwarding the packet to a leaf node within the assigned ECMP group.

Example 12 is one or more processors as in Example 11, wherein the instructions further comprise load balancing the ECMP group to identify an active leaf node within the ECMP group.

Example 13 is one or more processors as in any of Examples 11-12, wherein the instructions further comprise storing a label table comprising an indication of one or more ECMP groups associated with a spine node in a leaf-spine network topology.

Example 14 is one or more processors as in any of Examples 11-13, wherein the instructions further comprise storing the prefix table, comprising: an indication of a plurality of leaf nodes in a leaf-spine network topology; an indication of one or more networking prefixes associated with each of the plurality of leaf nodes; and an indication of one or more ECMP groups associated with each of the plurality of leaf nodes.

Example 15 is one or more processors as in any of Examples 11-14, wherein the instructions are implemented by a spine node within a two-layer leaf-spine network topology comprising a plurality of leaf nodes, wherein the spine node is in communication with each of the plurality of leaf nodes.

Example 16 is a method. The method includes receiving a data packet comprising a label, the label comprising a networking prefix. The method includes identifying the networking prefix. The method includes identifying an assigned equal-cost multipath (ECMP) group associated with the networking prefix based on a prefix table. The method includes forwarding the packet to a leaf node within the assigned ECMP group.

Example 17 is a method as in Example 16, further comprising load balancing the ECMP group to identify an active leaf node within the ECMP group.

Example 18 is a method as in any of Examples 16-17, further comprising storing a label table comprising an indication of one or more ECMP groups associated with a spine node in a leaf-spine network topology.

Example 19 is a method as in any of Examples 16-18, further comprising storing the prefix table, comprising: an indication of a plurality of leaf nodes in a leaf-spine network topology; an indication of one or more networking prefixes associated with each of the plurality of leaf nodes; and an indication of one or more ECMP groups associated with each of the plurality of leaf nodes.

Example 20 is a method as in any of Examples 16-19, wherein the method is implemented by a spine node within a two-layer leaf-spine network topology comprising a plurality of leaf nodes, wherein the spine node is in communication with each of the plurality of leaf nodes.

It is to be understood that any features of the above-described arrangements, examples, and embodiments may be combined in a single embodiment comprising a combination of features taken from any of the disclosed arrangements, examples, and embodiments.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system comprising:
a network topology comprising a spine node;
the spine node comprising a prefix table and a label table;
wherein the prefix table comprises:
a listing of a plurality of networking prefixes; and
an indication of an ECMP group and a leaf node associated with each prefix of the plurality of networking prefixes;
wherein the label table comprises a per-prefix label advertised from the spine node to an upstream leaf node in the network topology; and
wherein the per-prefix label results in a path list on the upstream leaf node that is unique to a corresponding prefix of the plurality of networking prefixes.

2. The system of claim 1, wherein the network topology further comprises a plurality of leaf nodes, and wherein the prefix table further comprises:
an indication of at least one equal-cost multipath routing (ECMP) group associated with each of the plurality of networking prefixes; and
an indication of at least one leaf node of the plurality of leaf nodes associated with each of the plurality of networking prefixes.

3. The system of claim 2, wherein the at least one ECMP group is unique for each of the plurality of networking prefixes such that ECMP resources for the network topology are not shared across the plurality of networking prefixes in the network topology.

4. The system of claim 1, wherein the network topology further comprises a plurality of leaf nodes, and wherein the label table further comprises:
an indication of at least one ECMP group associated with the spine node; and
an indication of which of the plurality of leaf nodes is associated with the at least one ECMP group associated with the spine node.

5. The system of claim 1, wherein the network topology further comprises a plurality of leaf nodes, and wherein each of the plurality of leaf nodes is associated with at least one ECMP group.

6. The system of claim 1, wherein the network topology further comprises a plurality of leaf nodes, and wherein each of the plurality of leaf nodes comprises a prefix table comprising:
the listing of the plurality of networking prefixes in the network topology; and
an indication of a unique ECMP group associated with each of the plurality of networking prefixes in the network topology.

7. The system of claim 1, wherein a single ECMP group is on the spine node and the single ECMP group points to two or more leaf nodes if the network topology.

8. The system of claim 1, wherein the spine node is a router, and wherein the network topology further comprises a plurality of leaf nodes each comprising a consumer electronic device.

9. The system of claim 1, wherein the spine node is configured to implement a routing policy comprising per-packet load balancing within an applicable ECMP group.

10. The system of claim 1, wherein the network topology is a leaf-spine Clos network topology comprising a plurality of spine nodes and a plurality of leaf nodes.

11. The system of claim 10, wherein the per-prefix label decouples label allocation used by any of the plurality of spine nodes at each level in the leaf-spine Clos network topology while enabling sharing of label rewrites and sharing of ECMP resources at each level in the leaf-spine Clos network topology.

12. The system of claim 1, wherein the label table comprises an indication of where the spine node should forward a packet based on a prefix attached to the packet.

13. The system of claim 1, wherein the network topology comprises a unique ECMP group on the upstream leaf node that is unique for each prefix of the plurality of networking prefixes.

14. The system of claim 1, wherein the network topology comprises a plurality of spine nodes arranged in a layer and further comprises a plurality of leaf nodes arranged in a layer, and wherein the plurality of spine nodes perform routing and serve as a backbone of the network topology such that each of the plurality of leaf nodes are interconnected with each of the plurality of spine nodes.

15. The system of claim 1, wherein at least one of the plurality of networking prefixes is a multi-homed prefix allocated on the spine node.

16. The system of claim 1, wherein the prefix table further comprises an indication that a first prefix of the plurality of networking prefixes points to a first ECMP group and further points to a first leaf node.

17. The system of claim 1, wherein the spine node is configured to execute instructions comprising:
receiving a data packet comprising a label;
identifying a networking prefix based on the label;
identifying an assigned ECMP group associated with the identified networking prefix based on the prefix table.

18. The system of claim 17, wherein the instructions further comprise:
load balancing the assigned ECMP group to identify an active leaf node within the assigned ECMP group; and
forwarding the data packet to the active leaf node within the assigned ECMP group.

19. The system of claim 18, wherein the network topology is a two-layer leaf-spine network topology comprising a plurality of leaf nodes, and wherein the spine node is in communication with each of the plurality of leaf nodes.

* * * * *